United States Patent [19]

LaFreniere et al.

[11] Patent Number: 5,084,183

[45] Date of Patent: Jan. 28, 1992

[54] FRACTIONATION OF LIGHT/HEAVY WAXES BY USE OF POROUS MEMBRANES

[75] Inventors: Lucie Y. LaFreniere, Brights Grove; Heather A. Boucher, Point Edward, both of Canada

[73] Assignee: Exxon Research and Engineering Company, Florham Park, N.J.

[21] Appl. No.: 607,172

[22] Filed: Oct. 31, 1990

[51] Int. Cl.$^5$ .............................. B01D 61/00
[52] U.S. Cl. ..................... 210/651; 210/652; 208/28; 208/33; 208/38; 585/818
[58] Field of Search ............ 210/651, 650, 653, 654, 210/641, 632, 634, 500.39, 652; 208/309, 33, 24, 28, 38, 33; 204/302; 562/528; 260/677; 585/818, 819

[56] References Cited

U.S. PATENT DOCUMENTS

| | | | |
|---|---|---|---|
| 3,244,763 | 4/1966 | Cohn | 260/677 |
| 4,192,733 | 3/1980 | Onodera et al. | 208/33 |
| 4,422,924 | 12/1983 | Onodera et al. | 208/33 |
| 4,532,041 | 7/1985 | Shuey et al. | 210/500.39 |
| 4,532,347 | 7/1985 | Vaughan | 562/528 |
| 4,541,917 | 9/1985 | West | 208/33 |
| 4,617,126 | 10/1986 | Funk et al. | 210/651 |
| 4,622,118 | 11/1986 | Chimenti et al. | 204/302 |
| 4,670,151 | 6/1987 | Bitter | 210/641 |
| 4,816,140 | 3/1989 | Trambouge et al. | 208/309 |
| 4,874,523 | 10/1989 | LaFreniere | 210/651 |
| 4,966,707 | 10/1990 | Cussler et al. | 210/632 |

OTHER PUBLICATIONS

"Solvent Extraction with Microporous Hydrophilic and Composite Membranes", Prasad et al., Aiche Journal, Jul. 1987, vol. 33, #7, pp. 1057–1066.
"Novel Uses of Microporous Membranes: A Case Study", Callahan, Aiche Symposium Series, Membrane Materials & Processes, No. 261, vol. 84, pp. 54–65, 1988.
"Liquid–Liquid Extraction With Microporous Hollow Fibers", D'Elia et al., J. Memb. Sci. 29 (1986), 309–319.
"Critical Entry Pressure for Liquids in Hydrophobic Membranes", Kim et al., J. Colloid & Interface Sci., vol. 115, #1, Jan. 1987, 1–8.

Primary Examiner—Robert A. Dawson
Assistant Examiner—Ana Fortuna
Attorney, Agent, or Firm—Joseph J. Allocca

[57] ABSTRACT

Mixtures of light and heavy waxes are fractionated by permeation through a porous membrane at temperatures just above the cloud point of the mixture with the heavier, higher melting point waxes being the component of the mixture which selectively permeates through the porous membrane.

7 Claims, 2 Drawing Sheets

FRACTIONATION OF LIGHT/HEAVY WAXES BY USE OF POROUS MEMBRANES

DESCRIPTION OF THE INVENTION

It has been discovered that mixtures of light, low melting point normal paraffin wax and heavy, high melting point normal paraffin wax can be separated by permeation of the heavy high melting point n-paraffin wax through a porous membrane, said separation being performed at just above the cloud point of the normal paraffin wax mixture. This is unexpected because porous membrane separation, being a size and shape selective separation procedure would have been expected to selectively permeate the lighter, lower melting point n-paraffin waxes which, presumably are of lower molecular weight and smaller molecular size. By the process of the present invention it has been discovered that the heavy n-paraffin wax crystallites forming at just above the cloud point have greater facility for passing through porous membranes than do the light n-paraffin waxes which may not yet have formed crystallites at the temperature at which the separation is performed.

BACKGROUND OF THE PRESENT INVENTION

Solvent dewaxing or autorefrigerative dewaxing of waxy hydrocarbon oils, especially waxy lubricating oils, transformer oils, specialty oils, white oil or even certain fuels fractions such as jet or kerosene result in the recovery of substantial quantities of wax. Fischer-Tropsch synthesis also is a route to the formation of substantial quantities of wax. In many instances, especially when the waxes are directly synthesized by the Fischer-Tropsch route, the waxes are characterized by being predominantly, i.e., about 75%, normal, straight chain paraffins which, while marked by having high viscosity indices are equally marked by having high melting points.

These waxes, however, although undesirable in oils or fuels, are themselves valuable products when used in specialized applications such as in the production of food containers, waxed papers, candles, etc.

Before these predominantly n-paraffin waxes can be employed in such applications, it is necessary to separate them into various fractions, i.e. softer, lower molecular weight waxes melting at lower temperature, and harder, higher molecular weight waxes melting at higher temperature. In this way specialized fractions especially well suited for particular applications are secured.

In the past these fractions have been recovered by distillation, which is an energy intensive operation or by melting followed by recrystallization. Recrystallization can be accomplished either in the presence or absence of a solvent such as MEK, MIBK, Toluene, mixtures of such solvents, etc.

It would be an improvement if the mixtures of n-paraffin waxes could be separated into light fractions and heavy fractions by a procedure less energy intensive than distillation and more selective than melting/recrystallization.

U.S Pat. No. 4,874,523 teaches a method for reducing the cloud point of materials, especially waxy hydrocarbon oils, by use of an ultrafiltration separation technique. The method comprises the steps of chilling the waxy oil so as to achieve submicron crystallization followed by ultrafiltration thereby effecting separation of a permeate of reduced cloud point from a retentate. Chilling to produce submicron p;crystallization is to a temperature about 3° C. or less above the cloud point of the material to be separated, preferably from 0.5° to 2° C. above the cloud point, most preferably between 1° to 2° C. above the cloud point. The membrane used is any ultrafiltration membrane which is inert in and non-reactive with the components of the solution, mixture or melt being separated, will not itself melt at the temperatures employed and possesses an effective pore size smaller than the submicron crystals formed upon chilling. The membrane also does not have a strong chemical affinity for the crystallized components of the feed mixture.

THE PRESENT INVENTION

Figure 1:
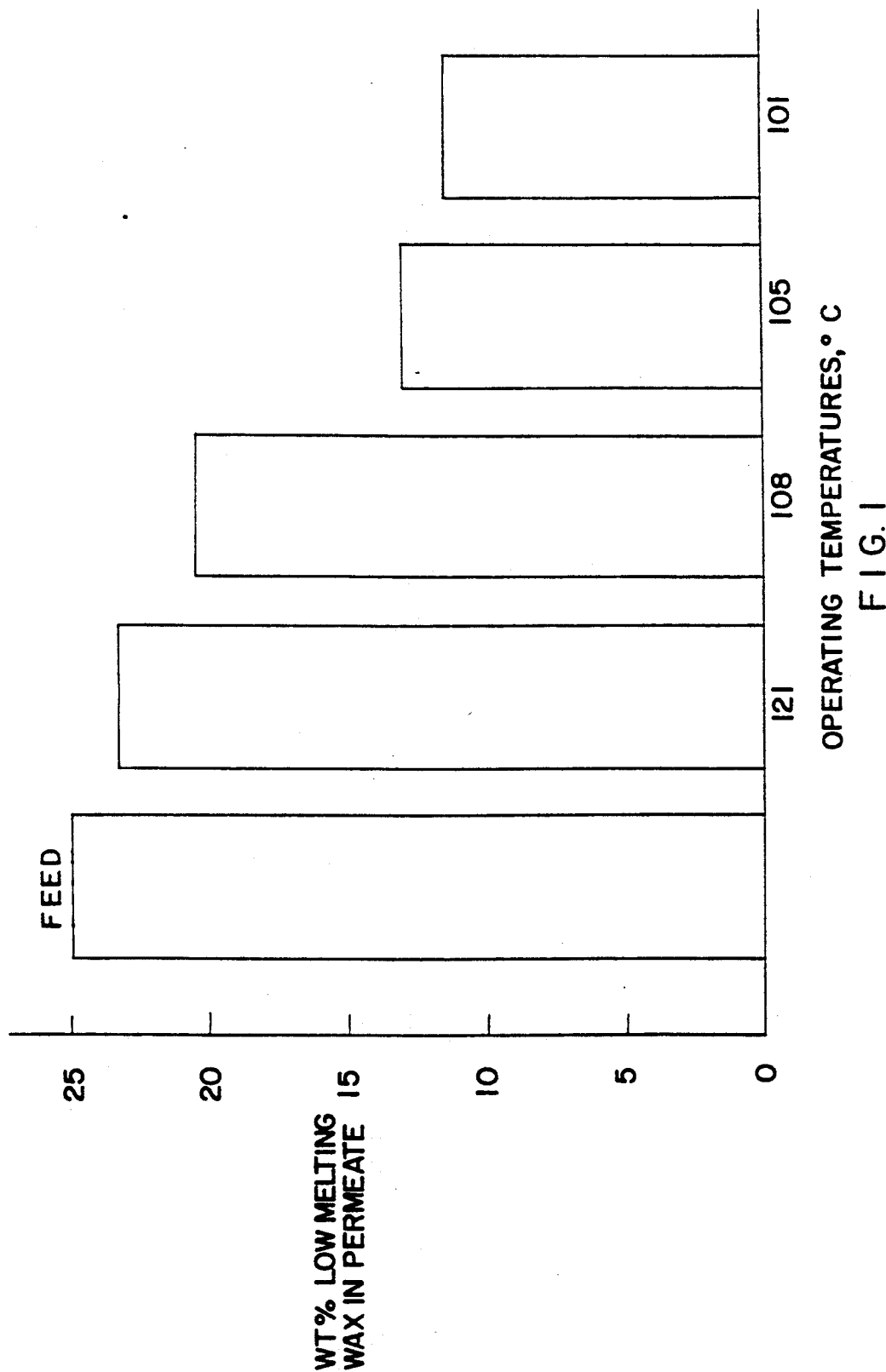
FIG. 1 shows the weight % low melting point wax in the permeate versus operating temperature for the process of the present invention.

It has been discovered that feed streams comprising mixtures of predominantly, i.e., about 75% or more, n-paraffin waxes ranging from lower molecular weight, low melting point waxes to higher molecular weight, high melting point waxes can be separated by the practice of the steps of melting the n-paraffin wax mixture to produce a uniform liquid wax feed stream, cooling the liquid wax feed stream to a temperature about 0.5° to 30° C. above the cloud point of the wax mixture (i.e., 0.5° to 30° C. above the crystallization temperature of the highest molecular weight wax component in the mixture) preferably about 0.5° to 20° C. above the cloud point and contacting this cooled mixture with a porous membrane under an applied pressure to thereby selectively permeate the heavy wax component through the membrane while producing a retentate containing the lower molecular weight, lower melting wax.

It is surprising that the high molecular weight wax component in the mixture selectively permeates through the porous membrane as compared to the lower molecular weight waxes, yielding a permeate rich in high molecular weight normal paraffin waxes.

The melting points of pure, normal paraffins are well defined and reported in numerous references, The CRC Handbook of Chemistry and Physics being one. It is well recognized that the melting points of the higher molecular weight normal paraffins are greater than those of the lower molecular weight analogues.

When mixtures of normal paraffins are considered, the higher molecular weight components will crystallize at higher temperatures than the lower molecular weight components. At high enough temperatures a mixture of normal paraffins will be in the liquid state, but as the temperature is lowered, the higher molecular weight components will crystallize first.

For the purposes of this specification and the following claims, the temperature at which these wax crystals are first detected is referred to as the Cloud Point. The Cloud Point is thus an indication of the temperature at which the highest molecular weight wax component will start to crystallize. This simplified concept holds true when all molecules in the mixture are of the same structural type, as in the case with the n-paraffin waxes addressed in the present specification.

It is believed that wax molecules will begin to associate in the molten mixture at temperatures close to but above their crystallization temperature, i.e. that the heavy, high molecular weight waxes will begin to associate at a temperature close to but above the "cloud point" of the n-paraffin wax mixture which is to be separated. At temperatures too high above the "cloud point" temperature, this association tendency will decrease. These molecular wax associations are hereinafter referred to as crystallites.

At temperatures just above the cloud point of the n-paraffin wax mixture, the highest molecular weight wax components will be in the form of crystallites while the lower molecular weight wax molecules will not be associated, or associated to a much lesser degree.

In view of this, it is surprising that the higher molecular weight wax components selectively permeate through the membrane because this means that the largest species, the heavy wax crystallites selectively permeate through the membrane in preference to the lower molecular weight, unassociated, smaller size individual molecules of light wax. It is presumed that the heavy wax crystallites are larger in cross section than are the individual molecules of the light wax.

For the purposes of this specification and the following claims, light wax means n-paraffin wax melting below 40° C. (as determined by Differential Scanning Calorimetry) while heavy wax means n-paraffin wax melting above 40° C. Because $n-C_{21}$ paraffin melts at 40.5° C., for the purposes of this specification it can be said that light wax has a molecular weight less than that of $n-C_{21}$ while heavy wax has a molecular weight equal to or greater than that of $n-C_{21}$.

In practicing the process of the present invention the n-paraffin wax feed mixture is heated until the mixture attains a uniform, liquid state. The feed is then cooled to a temperature in the range of just above (i.e., $-0.5°$ C.) to not more than 30° C. above the cloud point, preferably a temperature of just above to not more than 20° C. above the cloud point of the n-paraffin wax feed mixture. The cloud point of the particular n-paraffin wax mixture to be separated is determined empirically by the practitioner, with the process temperature being established once the particular mixture cloud point is established.

Once the n-paraffin wax mixture is chilled to this separation temperature of just above to less than 30° C., preferably less than 20° C. above the cloud point, the wax mixture is contacted with a porous membrane which is not fouled by the wax and which is inert to/non-reactive with the wax components. The membrane material can be either polymeric or inorganic.

The permeate is rich in the high melting point wax component of the mixture while the retentate is rich in the lower melting point, lighter waxes.

Because of the broad molecular weight range possible in any n-paraffin wax mixture it is possible to subject such a mixture to a number of sequential chilling/porous membrane separation steps. Thus, the retentate from a first porous membrane separation step could itself be chilled to a slightly lower temperature than the original feed while still being at a temperature just above but not more than 30° C., preferably not more than 20° C. above what would be the cloud point of the first stage retentate to produce a new feed sent to a second porous membrane separation unit wherein the high molecular weight waxes left in the stage 1 retentate are recovered as the new permeate and a retentate is recovered which is lean in such high molecular weight waxes. This stage 2 retentate can itself then be cooled to just above but less than 30° C., preferably less than 20° C. above the second stage retentate cloud point and subjected to porous membrane separation to recover the heaviest wax still present in that retentate as a new 3rd stage permeate, etc. Thus it is clear that any number of separation stages can be employed, each stage recovering a distinct fraction of wax, as permeate, each permeate fraction being the "heaviest" wax remaining in the feed, yet each fraction being, in turn lighter than the preceding heavy permeate.

Porous membrane separation is conducted under conditions such that a pressure differential exists between the feed/retentate side of the membrane and the permeate side. The pressure differential can be created either by applying a pressure on the feed/retentate side of the membrane of between 25 to 800 psi, preferably 25 to 600 psi, most preferably between 25 to 300 psi, or by drawing a vacuum of between 1 to 1000 mbar. The porous membranes used in the present invention typically have pore sizes less than 5 microns, preferably in the range 0.0002 to 1 micron, most preferably 0.001 to 0.1 micron. Membranes can be made from polymeric material or can even be sintered glass or ceramic. Representative of useful membranes are Celgard microporous films, made from isotactic polypropylene, (e.g. Celgard 2502 having an effective pore size of 0.04 microns), Gore-Tex membranes made from teflon having pores in the range of 0.02 micron or Nuclepore membranes (made from polycarbonate or polyester) with pore sizes of 0.015 to 0.4 microns.

EXPERIMENTAL

The feed was a mixture of n-paraffins of which 25 wt % melted below 40° C. and 75 wt % above 40° C. A commercial polycarbonate membrane supplied by Nuclepore was used. The membrane pore structure is known to be symmetrical and uniformly circular, with pore diameter 0.015 μm.

The experiment consisted of circulating the wax feed under pressure (150 psig) across the surface of the membrane in the test unit. The permeate wax (the fraction of the feed which passed through the membrane) was collected at atmospheric pressure. The operating temperature was varied from 121° to 101° C. A permeate sample was collected at each temperature and analyzed by Differential Scanning Calorimetry (DSC).

RESULTS

The DSC results are shown in FIG. 1, which indicates the wt % wax melting below 40° C. in the feed and in the different permeates. The results indicate that all of the permeates contained less wax melting below 40° C. than did the feed. As well, the decrease in the wt % low melting wax was greatest for the lower experimental operating temperatures. For example, there was only 11.5 wt % low melting wax in the permeate collected at the operating temperature of 101° C., compared to 25 wt % in the feed.

Figure 2:
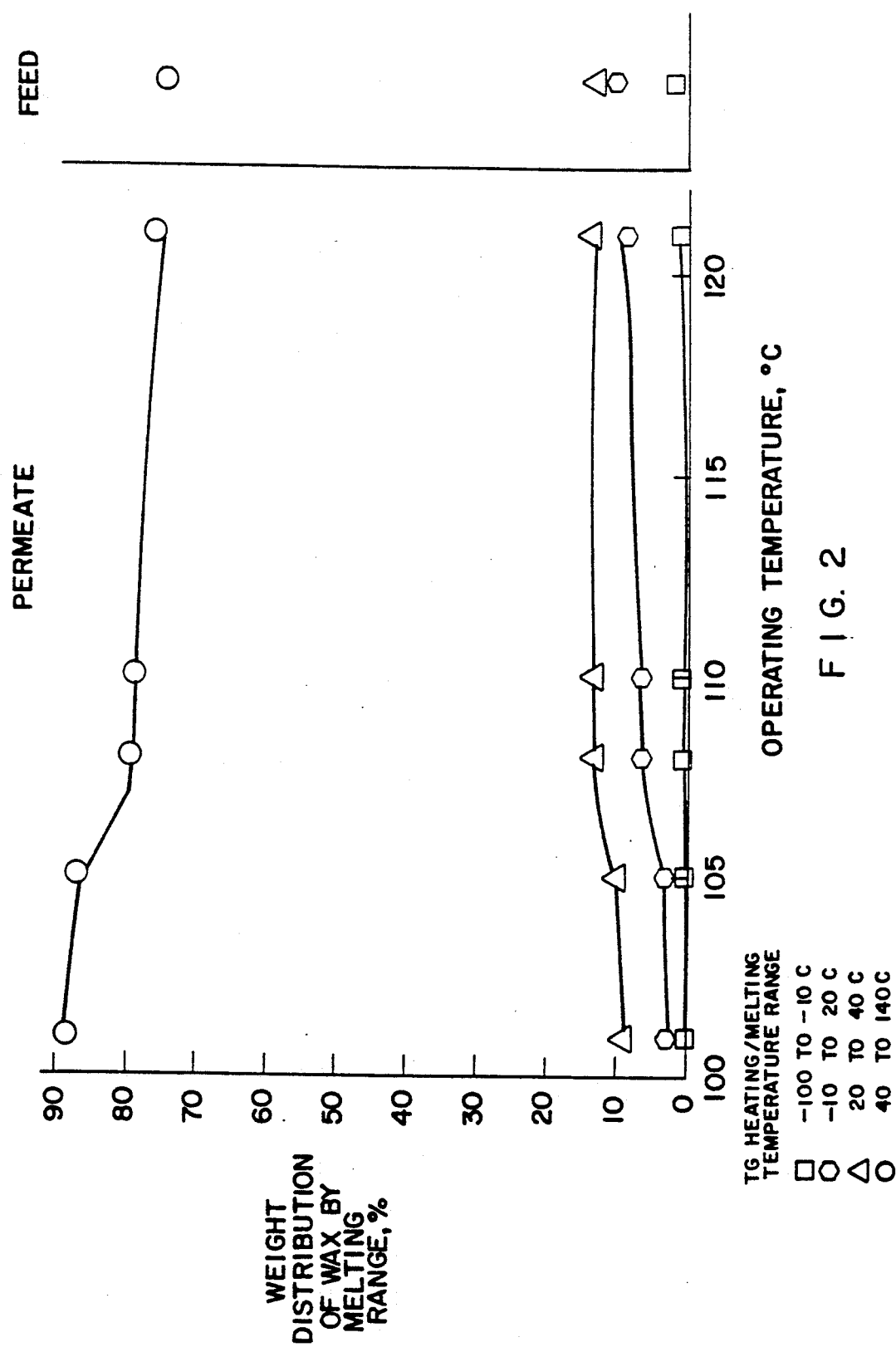
FIG. 2 shows the effect of operating temperature on weight distribution of wax in the permeate.

In FIG. 2, the DSC results are shown as plots of weight distribution of wax (per DSC melting range) versus feed operating temperature. These plots indicate that there is a preferred operating temperature range (in this case for this n-paraffin wax feed mixture, <108° C.) in which to cause separation of low and high melting waxes. Presumably, this is related to the formation of wax crystallites.

Porous membrane separation performance results are usually expressed in terms of rejection, (in this case of low melting (<40° C.) wax) and permeation rate. The permeation rate is the quantity of permeate collected per unit surface area of membrane and unit time (1/m².day). Low melting wax rejection is calculated from the difference in light wax concentration between feed and permeate. Selectivity can also be used as a measure of separation performance. The porous membrane separation performance data for the high/low melting wax separation is given in Table 1. It shows an increase in the percent rejection from 7 to 54%, and in selectivity from 1.1 to 2.6, on lowering the operating temperature from 121° to 101° C. There was a corresponding decrease in the permeation rate from 255 to 10 1/m².day.

What is claimed is:

TABLE 1

MEMBRANE PERFORMANCE DATA ON LIGHT/HEAVY WAX SEPARATION

| Feed Operation Temperature °C. | Measure of Separation | | Permeation Rate L/m²day |
|---|---|---|---|
| | % Rejection of Light Wax | Selectivity for Heavy Wax | |
| 121 | 6.8 | 1.1 | 255 |
| 108 | 18 | 1.3 | 155 |
| 105 | 47.6 | 2.2 | 35 |
| 101 | 54 | 2.6 | 10 |

Note:

% Rejection = $\left[1 - \frac{Xp}{Xf}\right] \times 100\%$

Selectivity = $\frac{(Yp/Xp)}{(Yf/Xf)}$ where X, Y, are light and heavy wax concentration
p, f, are permeate and feed 1. A method for separating high molecular weight, high melting point normal paraffins from feed streams of predominantly n-paraffin waxes comprising mixtures of lower molecular weight, low melting point waxes and higher molecular weight, high melting point waxes by practice of the steps of heating normal paraffin wax feed stream to melt the waxes present therein and thereby produce a uniform liquid wax feed stream, cooling the liquid n-paraffin wax feed stream to a temperature about 0.5° to 30° C. above the cloud point of the wax mixture, contacting the thus cooled mixture with a porous membrane having a pore size less than 5 microns under a pressure differential between the feed side of the membrane and the retentate side of the membrane thereby producing a permeate of a heavy, high molecular weight, high melting point wax through the membrane and a retentate of lighter, lower molecular weight, lower melting point wax.

2. The method of claim 1 wherein the liquid n-paraffin wax feed stream is cooled to a temperature about 0.5° to 20.0° C. above the cloud point of the wax feed stream.

3. The method of claim 1 or 2 wherein the porous membrane is selected from polymeric membrane, or inorganic membranes and has a pore size of less than 5 microns.

4. The method of claim 3 wherein the porous membrane has a pore size in the range 0.0002 to 1.0 micron.

5. The method of claim 1 or 2 wherein the pressure is between 25 to 800 psig.

6. The method of claim 1 or 2 comprising the additional steps of cooling the retentate from the porous membrane separation step to a temperature lower than that to which the original feed was chilled but still 0.5° to 30° C. above the cloud point of the retentate and contacting this cooled retentate with a second porous membrane under pressure thereby producing a second permeate containing the high molecular weight, high melting point wax left in the cooled retentate and a second retentate lean in such high molecular weight waxes.

7. The method of claim 6 wherein the second retentate is cooled to a temperature about 0.5° to 30° C. above the cloud point of said second stage retentate and this cooled second stage retentate is contacted with a porous membrane under pressure to produce a third permeate containing the heavy, high molecular weight wax remaining in the second stage retentate and a third stage retentate lean in said heavy wax fraction.

* * * * *